United States Patent
Han

(10) Patent No.: US 7,639,850 B2
(45) Date of Patent: Dec. 29, 2009

(54) APPARATUS AND METHOD FOR ANALYZING COMPONENT USING MICROSCOPIC REGIONS

(75) Inventor: Sang-Joon Han, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 841 days.

(21) Appl. No.: 11/145,177

(22) Filed: Jun. 6, 2005

(65) Prior Publication Data

US 2006/0088197 A1    Apr. 27, 2006

(30) Foreign Application Priority Data

Oct. 22, 2004    (KR) ..................... 10-2004-0084874

(51) Int. Cl.
G06K 9/00    (2006.01)

(52) U.S. Cl. ..................................... 382/128

(58) Field of Classification Search ....................... None
See application file for complete search history.

(56) References Cited

U.S. PATENT DOCUMENTS 6,018,587 A * 1/2000 Cabib ......................... 382/165
6,553,135 B1 * 4/2003 Douglass et al. ............ 382/128

OTHER PUBLICATIONS

Raymond H. Myers, *Classical and Modern Regression With Applications*, 2nd Edition, Duxbury Press, Wadsworth Publishing Company, PWS—Kent Publishing Company, 1986 and 1990, pp. 81-83.
Norimichi Tsumura et al., *Independent Component Analysis of Spectral Absorbance Image in Human Skin*, Optical Review vol. 7, No. 6, 2000, pp. 479-482.
Richard O. Duda et al., *Pattern Classification*, 2nd Edition, John Wiley & Sons, Inc., Wiley-Interscience Publication, 2001, pp. vii-xvi and 570-573.
Todd K. Moon and Wynn C. Stirling, *Mathematical Methods and Algorithms for Signal Processing*, Prentice-Hall, Inc., 2000, pp. v-xvi and 327-330.

* cited by examiner

*Primary Examiner*—Brian P Werner
*Assistant Examiner*—Claire Wang
(74) *Attorney, Agent, or Firm*—Staas & Halsey LLP

(57) ABSTRACT

An apparatus for and a method of analyzing components using microscopic regions. The apparatus includes: an image obtainer obtaining an image of a part of a living body; a color information generator generating color information of an image having a matrix pattern from a size of the microscopic regions and the obtained image; a first data transformer transforming the color information of the image into a product of first and second matrixes; and a component analyzer analyzing components of the obtained image using at least one of the first and second matrixes. When the obtained image is divided into a plurality of microscopic regions, the size of the microscopic regions is determined so that concentrations of components of the part fluctuate in each of the microscopic regions.

20 Claims, 8 Drawing Sheets

APPARATUS AND METHOD FOR ANALYZING COMPONENT USING MICROSCOPIC REGIONS

CROSS-REFERENCE TO RELATED APPLICATION

This application claims the priority of Korean Patent Application No. 10-2004-0084874, filed on Oct. 22, 2004, in the Korean Intellectual Property Office, the disclosure of which is incorporated herein by reference.

BACKGROUND OF THE INVENTION

1. Field of the Invention

The present invention relates to the analysis of components of a living body, and more particularly, to an apparatus for and a method of analyzing components of a living body using microscopic regions.

2. Description of Related Art

A plurality of calibration data on a particular component are generally required to obtain a regression equation for non-invasively measuring concentrations of components of a living body. One of conventional methods of measuring concentrations of components using calibration data is disclosed in a book, entitled "Classical and Modern Regression with Applications" by Raymond M. Myers and published by Duxbury Press, p. 82.

In such a conventional method, light must be transmitted to or reflected from a living body whenever calibration data is obtained. Thus, the conventional method is complicated for the living body to be analyzed as well as a user desiring to analyze components.

BRIEF SUMMARY

An aspect of the present invention provides an apparatus for analyzing components using microscopic regions by which components of a predetermined part of a living body can be non-invasively analyzed using an image of the predetermined part.

An aspect of the present invention provides a method of analyzing components using microscopic regions by which components of a predetermined part of a living body can be non-invasively analyzed using an image of the predetermined part.

According to an aspect of the present invention, there is provided an apparatus for analyzing components using microscopic regions, including: an image obtainer obtaining an image of a part of a living body; a color information generator generating color information of an image having a matrix pattern from a size of microscopic regions and the obtained image; a first data transformer transforming the color information of the image into a product of first and second matrixes; and a component analyzer analyzing components of the obtained image using at least one of the first and second matrixes. When the obtained image is divided into a plurality of microscopic regions, the size of the microscopic regions is determined so that concentrations of components of the part vary in each of the microscopic regions.

According to another aspect of the present invention, there is provided a method of analyzing components using microscopic regions, including: obtaining an image of a part of a living body; generating color information of an image having a matrix pattern from a size of microscopic regions and the obtained image; transforming the color information of the image into a product of first and second matrixes; and analyzing components of the obtained image using at least one of the first and second matrixes. When the obtained image is divided into a plurality of microscopic regions, the size of the microscopic regions is determined so that concentrations of components of the part vary in each of the microscopic regions.

According to another aspect of the present invention, there is provided an apparatus for analyzing components using microscopic regions, including: an image obtainer obtaining an image of a part; a color information generator generating color information of an image having a matrix pattern using the obtained image and a size of microscopic regions into which the obtained image is divided, the size being such that concentrations of components of the part vary in each of the microscopic regions; a first data transformer transforming the color information into a product of first and second matrixes; and a component analyzer analyzing components of the obtained image using at least one of the first and second matrixes.

According to another aspect of the present invention, there is provided a method of determining whether a part includes a component, including: obtaining an image of the part; generating color information of an image having a matrix pattern from a size of microscopic regions and the obtained image; transforming the color information into a product of first and second matrixes; and analyzing components of the obtained image using at least one of the first and second matrixes. The obtained image is dividable and when the obtained image is divided into a plurality of microscopic regions, the size of the microscopic regions is such that concentrations of components of the part vary in each of the microscopic regions.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Figure 1:
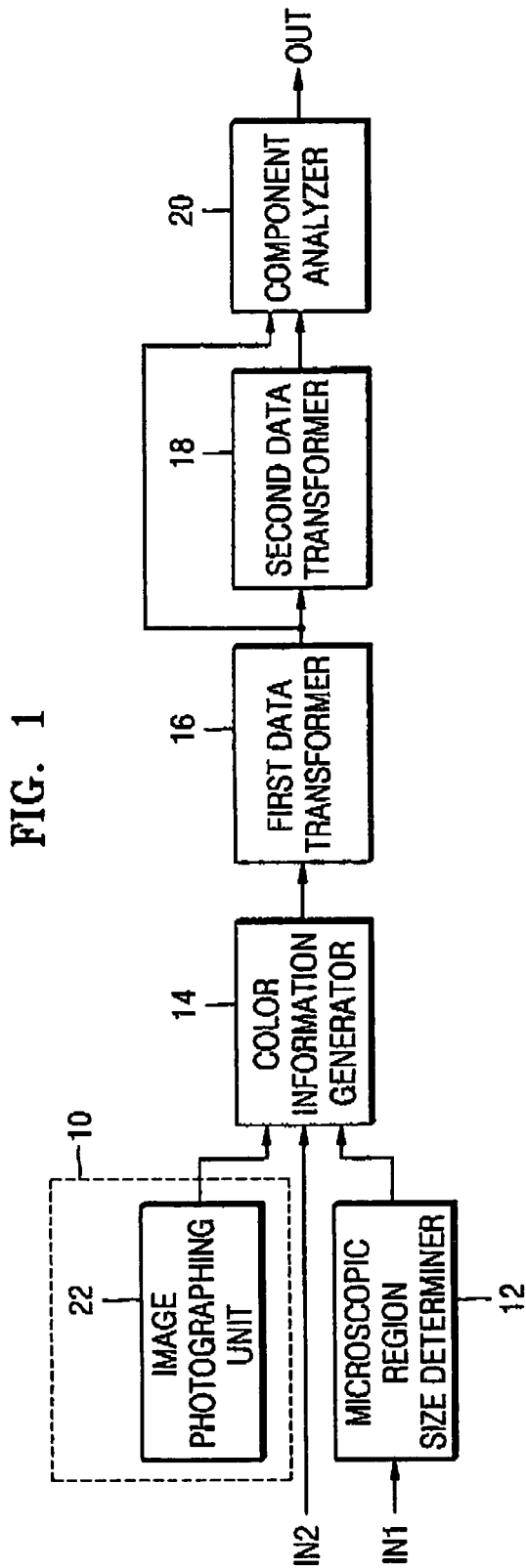
FIG. 1 is a block diagram of an apparatus for analyzing components using microscopic regions, according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an apparatus for analyzing components using microscopic regions, according to an embodiment of the present invention. Referring to FIG. 1, the apparatus includes an image obtainer 10, a microscopic region size determiner 12, a color information generator 14, a first data transformer 16, a second data transformer 18, and a component analyzer 20.

Figure 2:
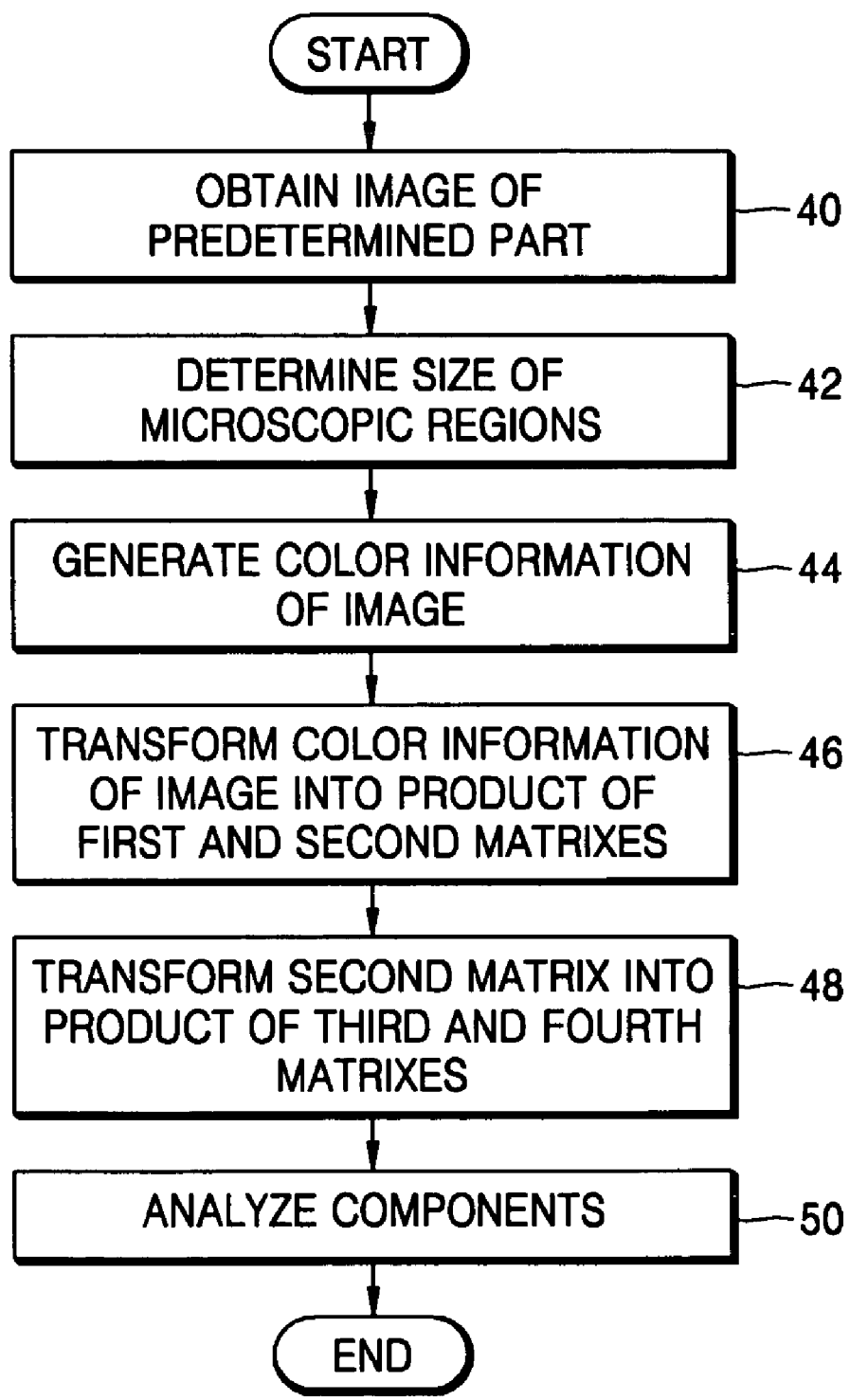
FIG. 2 is a flowchart of a method of analyzing components using microscopic regions, according to an embodiment of the present invention.

FIG. 2 is a flowchart of a method of analyzing components using microscopic regions, according to an embodiment of the present invention. The method includes obtaining an image of a predetermined part (operation 40), determining a size of microscopic regions (operation 42), and generating color information of an image using the obtained image and the determined size (operation 44). The method also includes transforming data (operations 46 and 48) and analyzing components (operation 50).

The method of FIG. 2 may be performed by the apparatus of FIG. 1 and is, for ease of explanation, described in conjunction with that figure. However, it is to be understood that the subject method can be performed by other apparatuses. Referring to FIGS. 1 and 2, in operation 40, the image obtainer 10 obtains an image of a predetermined part of a living body and outputs the image to the color information generator 14. Here, according to the present embodiment, the predetermined part of the living part may be, for example, the skin of the living body. In this case, the image obtainer 10 obtains an image of the skin of the living body.

For this purpose, the image obtainer 10 may be an image photographing unit 22 which photographs the predetermined part of the living body and outputs the photographed result to the color information generator 14. For example, the image photographing unit 22 may be a spectrometer, a digital camera, or the like. In more detail, the image photographing unit 22 may be, by way of non-limiting examples, an array detector, a charge coupled device (CCD), or the like.

According to an aspect of the present invention, after operation 40, in operation 42, the microscopic region size determiner 12 may determine a size of a plurality of microscopic regions into which the image obtained by the image obtainer 10 is divided so that concentrations of components of the predetermined part fluctuate (i.e., vary) in each of the microscopic regions.

The determination of the size of the microscopic regions will now be described in more detail with reference to various ones of the attached drawings.

Figure 3A:
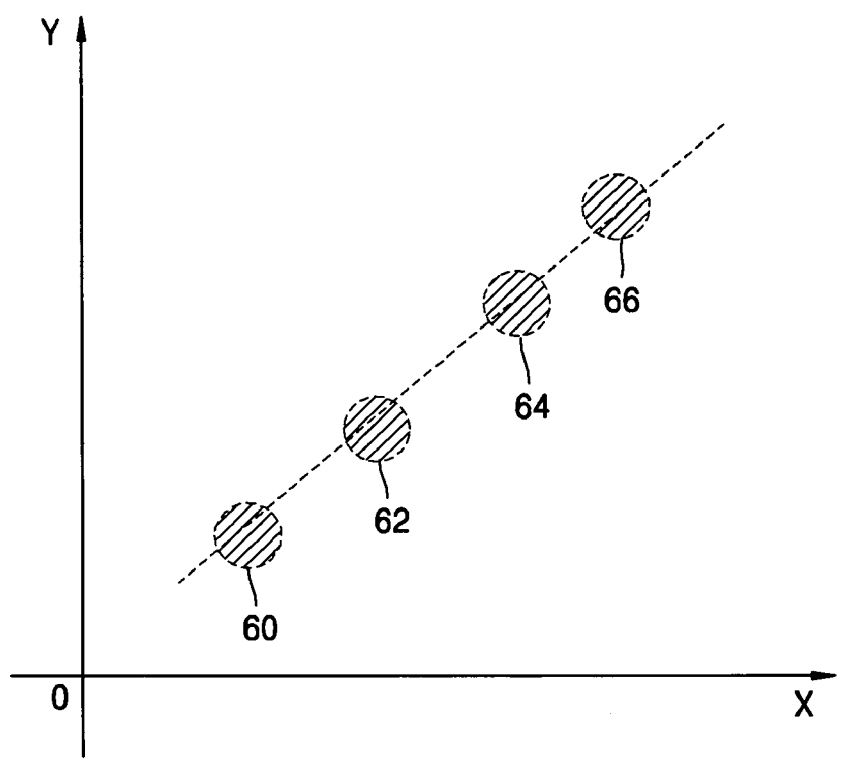
FIG. 3A is a graph illustrating a relationship between a measured concentration value and a predicted concentration value.
Figure 3B:
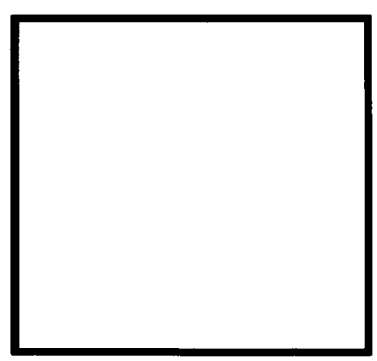
FIG. 3B is a view illustrating a macroscopic domain.

FIG. 3A is a graph illustrating a relationship between a measured concentration value X and a predicted concentration value Y, and FIG. 3B is a view exemplarily illustrating a macroscopic domain obtained from the living body.

When the image of the predetermined part of the living part is obtained in a macroscopic domain as shown in FIG. 3B, a relationship between measured and predicted concentration values of the obtained macroscopic domain is shown in FIG. 3A. In other words, dots 60, 62, 64, and 66 shown in FIG. 3A are obtained from an image of the macroscopic domain shown in FIG. 3B.

In general, a regression equation may be expressed as in Equation 1:

$$Y = a_1 + a_2 \cdot X \tag{1}$$

wherein Y denotes a predicted value (a dependent variable or a response), X denotes a measured value (an independent variable or an explanatory), and $a_1$ and $a_2$ denote regression coefficients.

Figure 4A:
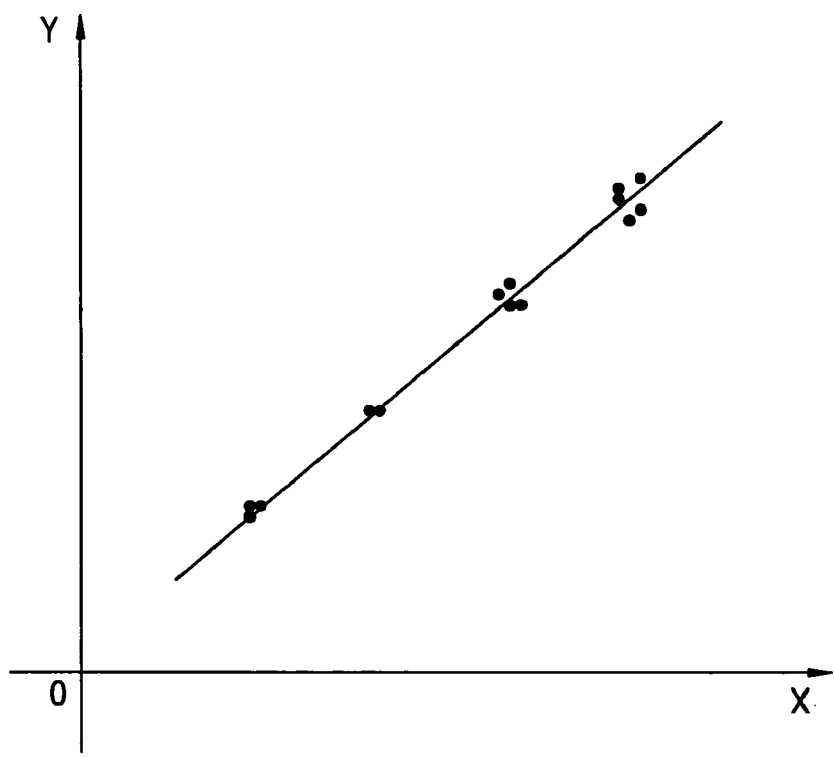
FIG. 4A is a graph illustrating a relationship between a measured concentration value and a predicted concentration value.
Figure 4B:
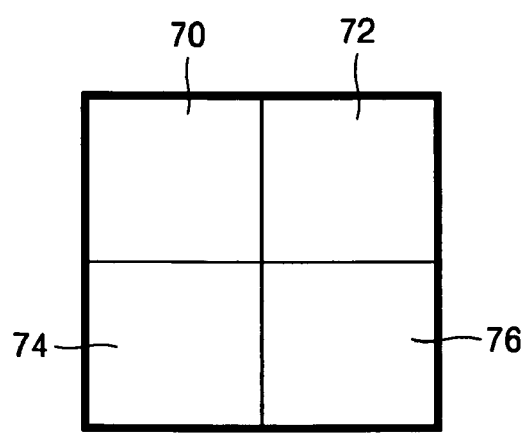
FIG. 4B is a view exemplarily illustrating microscopic regions.

FIG. 4A is a graph illustrating a relationship between a measured concentration value X and a predicted concentration value Y, and FIG. 4B is a view exemplarily illustrating microscopic regions 70, 72, 74, and 76 into which a macroscopic domain obtained from a living body is divided.

When the macroscopic domain shown in FIG. 3B is divided into the microscopic regions 70, 72, 74, and 76 as shown in FIG. 4B, each of the dots 60, 62, 64, and 66 shown in FIG. 3A is dispersed as a plurality of dots as shown in FIG. 4A.

Figure 5A:
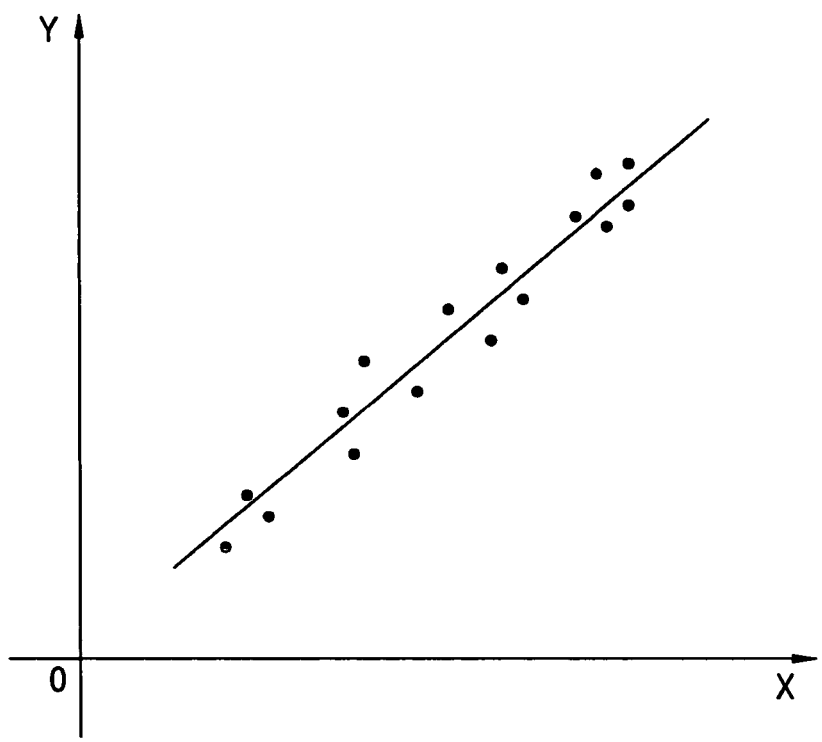
FIG. 5A is a graph illustrating a relationship between a measured concentration value and a predicted concentration value.
Figure 5B:
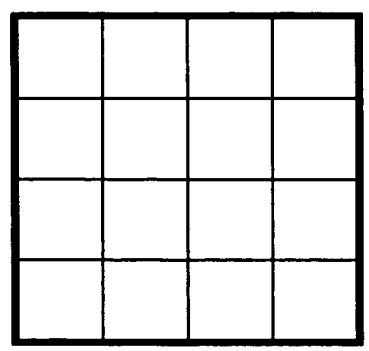
FIG. 5B is a view exemplarily illustrating 20 microscopic regions.

FIG. 5A is a graph illustrating a relationship between a measured concentration value X and a predicted concentration value Y, and FIG. 5B is a view exemplarily illustrating 20 microscopic regions into which a macroscopic domain obtained from a living body is divided.

When the macroscopic domain shown in FIG. 3B is divided into microscopic regions smaller than the microscopic regions shown in FIG. 4B as shown in FIG. 5B, the dispersed dots shown in FIG. 4A are further dispersed as shown in FIG. 5A.

Figure 6A:
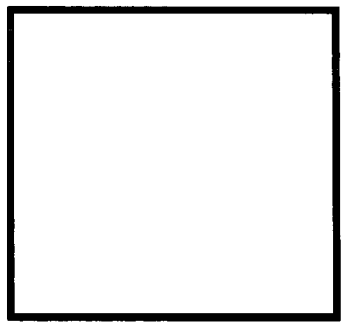
FIG. 6A is a view illustrating a macroscopic domain.
Figure 6B:
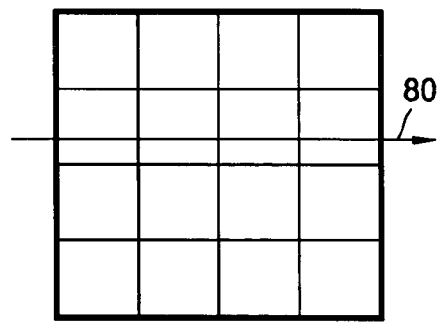
FIG. 6B is are view illustrating microscopic domains.
Figure 6C:
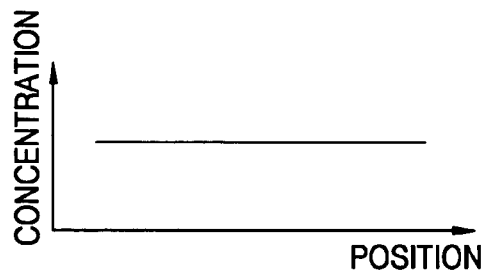
FIG. 6C is a graph illustrating a relationship between concentration and position of the macroscopic domain shown in FIG. 6A.
Figure 6D:
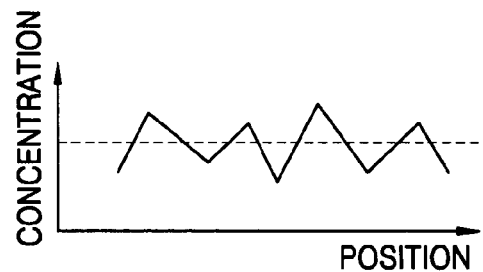
FIG. 6D is a graph illustrating a relationship between concentrations and positions of the microscopic regions shown in FIG. 6B.

FIG. 6A illustrates a macroscopic domain, FIG. 6B illustrates microscopic regions, FIG. 6C is a graph illustrating a relationship between a concentration of the macroscopic domain shown in FIG. 6A and a position of a living body, and FIG. 6D is a graph illustrating a relationship between concentrations of the microscopic regions shown in FIG. 6B and the position of the living body.

The concentration of the macroscopic domain shown in FIG. 6A shows a constant value regardless of variations in a special position within the macroscopic domain, as shown in FIG. 6C. However, the concentrations of the microscopic regions shown in FIG. 6B fluctuate in each of the microscopic regions, i.e., with variations in special positions of the microscopic regions, as show in FIG. 6D. This fluctuation is caused by Brownian Motion of the concentration of a component in a direction indicated by arrow 80 shown in FIG. 6B.

Figure 7A:
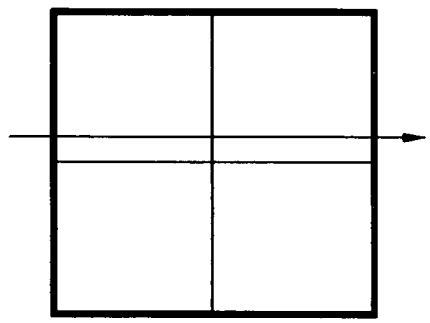
FIG. 7A is a view illustrating microscopic regions.
Figure 7B:
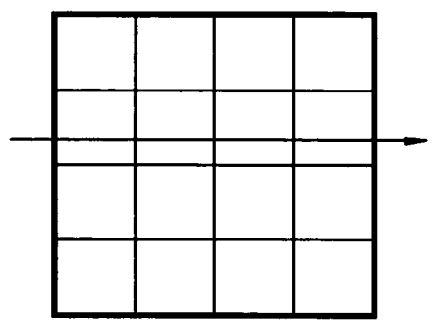
FIG. 7B is a view illustrating microscopic regions.
Figure 7C:
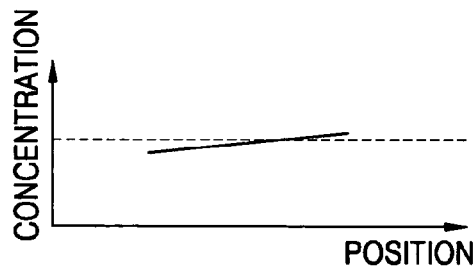
FIG. 7C is a graph illustrating a relationship between concentrations and positions of the microscopic regions shown in FIG. 7A.
Figure 7D:
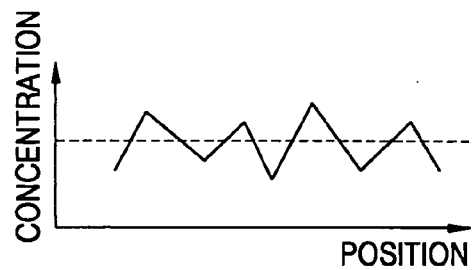
FIG. 7D is a graph illustrating a relationship between concentrations and positions of the microscopic regions shown in FIG. 7B.

FIG. 7A illustrates microscopic regions having large sizes, FIG. 7B illustrates microscopic regions having relatively smaller sizes than the microscopic regions shown in FIG. 7A, FIG. 7C is a graph illustrating the relationship between concentrations of the microscopic regions shown in FIG. 7A and a position of a living body, and FIG. 7D is a graph illustrating the relationship between concentrations of the microscopic regions having sizes shown in FIG. 7B and the position of the living body.

When a macroscopic domain is divided into the microscopic regions having sizes shown in FIG. 7A, a concentration of a component does not fluctuate in each of the microscopic regions as shown in FIG. 7C. However, when the macroscopic domain is divided into the microscopic regions having sizes shown in FIG. 7B, i.e., microscopic regions smaller than the microscopic regions shown in FIG. 7A, the concentration of the component fluctuates in each of the microscopic regions as shown in FIG. 7D. Thus, the size of microscopic regions must be determined as shown in FIG. 7B instead of FIG. 7A so that the concentration of the component fluctuates as shown in FIG. 7D, so as to analyze components of a living body using the microscopic regions.

A length of a side of the macroscopic domain may be, for example, several mm, while a length of a side of each of the microscopic regions may be, for example, several tens μm. In general, components of a predetermined part of a living body are not homogeneously distributed according to their positions on the living body. This is because the predetermined part of the living body is affected by various factors such as the surroundings of the living body or the like. In other words, concentrations of microscopic regions into which a macroscopic domain is divided are heterogeneously distributed and equal to a concentration of the macroscopic domain. When factors making special concentration distributions of components of the predetermined part of the living body heterogeneous differently affect the components, the distributions of the components are statistically independent. This is disclosed in a book, entitled "Optical Review" and published by The Institute of Pure and Applied Physics (IPAP), 2000, Vol. 7, No. 6, p. 479-482.

According to the present embodiment, the microscopic region size determiner 12 may receive a predetermined diffusion coefficient and a predetermined concentration fluctuation value via an input node IN1 and determine the size of the microscopic regions using the predetermined diffusion coefficient and the predetermined concentration fluctuation value. Here, the predetermined diffusion coefficient indicates a diffusion degree of the components of the predetermined part of the living body in the microscopic regions, for example, in the direction indicated by the arrow 80 shown in FIG. 6B. According to the present embodiment, the microscopic region size determiner 12 (of FIG. 1) may determine the size of the microscopic regions as in Equation 2:

$$d_1 = \frac{ln\left(\frac{F_t}{K}\right) + \frac{1}{2}\sigma^2(T-t)}{\sigma\sqrt{T-t}} \quad (2)$$

$$d_2 = d_1 - \sigma\sqrt{T-t}$$

wherein $d_1$ and $d_2$ denote horizontal and vertical lengths of each of the microscopic regions, σ denotes the diffusion coefficient, f denotes the predetermined concentration fluctuation value, t denotes time, T denotes an average resident time, $F_t$ denotes a fluctuating force for the time t, K denotes a viscosity modulus, and f(t) is expressed as in Equation 3.

$$f(t) = e^{-r(T-t)}[F_t - N(d_1) - K - N(d_2)] \quad (3)$$

wherein r denotes a lag coefficient, and N(d1) and N(d2) denote fugacity functions.

After operation 42, in operation 44, the color information generator 14 generates color information A (hereinafter, a bold character is referred to as a matrix) of an image having a matrix pattern from the size of the microscopic regions input from the microscopic region size determiner 12 and the obtained image input from the image obtainer 10 (of FIG. 1) and outputs the color information A of the image to the first data transformer 16 (of FIG. 1).

Figures 8A, 8B:
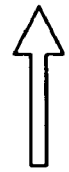
FIGS. 8A and 8B are views illustrating a generation of color information.

FIGS. 8A and 8B are views illustrating the generation of color information. In other words, FIG. 8A illustrates the image obtained by the image obtainer 10 (of FIG. 1), i.e., a macroscopic domain, and FIG. 8B illustrates microscopic regions into which the macroscopic domain is divided. Here, the macroscopic domain shown in FIG. 8A includes p×q pixels $x_{11}, x_{12}, \ldots,$ and $x_{pq}$.

For example, when the image shown in FIG. 8A is obtained by the image obtainer 10 (of FIG. 1), the color information generator 14 divides the image of FIG. 8A input from the image obtainer 10 into the microscopic regions to obtain the P×Q microscopic regions $D_{11}, D_{12}, \ldots,$ and $D_{PQ}$ shown in FIG. 8B. Here, the color information generator 14 determines a size of each of the microscopic regions depending on the horizontal and vertical lengths $d_1$ and $d_2$ input from the microscopic region size determiner 12 (of FIG. 1). The color information generator 14 (of FIG. 1) generates the color information A of the image consisting of color components of each of the microscopic regions $D_{11}, D_{12}, \ldots,$ and $D_{PQ}$. For example, the color information A of the image generated by the color information generator 14 can be expressed as in Equation 4:

$$A = \begin{bmatrix} V_{D11} \\ V_{D12} \\ \vdots \\ V_{DPQ} \end{bmatrix} \quad (4)$$

wherein $V_{D11}, V_{D12}, \ldots,$ and $V_{Dpq}$ denote color component values of the microscopic regions $D_{11}, D_{12}, \ldots,$ and $D_{PQ}$ shown in FIG. 8B, respectively. For example, when the image photographing unit 22 (of FIG. 1) is the digital camera, the color component values $V_{D11}, V_{D12}, \ldots,$ and $V_{Dpq}$ can be expressed as in Equation 5:

$$V_{D11} = [R_{D11}, G_{D11}, B_{D11}] \quad (5)$$

$$V_{D12} = [R_{D12}, G_{D12}, B_{D12}]$$

$$\vdots$$

$$V_{DPQ} = [R_{DPQ}, G_{DPQ}, B_{DPQ}]$$

wherein $R_{D11}, R_{D12}, \ldots,$ and $R_{DPQ}$ denote average values of red (R) components of pixels of the microscopic regions $D_{11}, D_{12}, \ldots,$ and $D_{PQ}$, and $G_{D11}, G_{D12}, \ldots,$ and $G_{DPQ}$ denote average values of green (R) components of the pixels of the microscopic regions $D_{11}, D_{12}, \ldots,$ and $D_{PQ}$, and $B_{D11}, B_{D12}, \ldots,$ and $B_{DPQ}$ denote average values blue (B) components of the pixels of the microscopic regions $D_{11}, D_{12}, \ldots,$ and $D_{PQ}$.

According to the present embodiment, operations 40 and 42 may be performed at the same time or operation 42 may be performed prior to operation 40.

In an alternative embodiment of the present invention, the apparatus shown in FIG. 1 may not include the microscopic region size determiner 12, and the method shown in FIG. 2 may not include operation 42. In this case, the color information generator 14 receives the size of the microscopic regions not from the microscopic region size determiner 12 but from an external source via an input node IN2. The size of the microscopic regions input via the input node IN2 is predetermined. According to the present embodiment, horizontal and vertical lengths of the microscopic regions may be equal or different.

After operation 44, in operation 46, the first data transformer 16 transforms the color information A of the image input from the color information generator 14 into a product of first and second matrixes as in Equation 6 and outputs the transformation result.

$$A = B \cdot C \tag{6}$$

wherein B and C denote the first and second matrixes, respectively. According to the present invention, the first data transformer 16 may transform the color information A of the image into the first and second matrixes B and C using the Karhunen-Lowe transformation method. Here, components of the second matrix C are not correlative and not statistically independent. Here, the Karhunen-Lowe transformation method is disclosed in a book, entitled "Mathmatical Methods and Algorithms for Signal Processing" by Todd K. Moon and Wynn C. Stirling and published by the Prentice Hall, p. 327.

According to another alternative embodiment of the present invention, the apparatus shown in FIG. 1 may not include the second data transformer 18, and the method shown in FIG. 2 may not include operation 48. In this case, after operation 46, in operation 50, the component analyzer 20 analyzes components of the obtained image using at least one of the first and second matrixes B and C input from the first data transformer 16 and outputs the analysis result via an output node OUT.

According to the present embodiment, when the first data transformer 16 transforms the color information A of the image using the Karhunen-Lowe transformation method as previously described, the component analyzer 20 may search a number of significant independent components of components $C_1, C_2, \ldots, C_i, \ldots,$ and $C_l$ ($1 \leq i \leq l$) of the second matrix C and determines using the searched number whether the obtained image includes a predetermined component. Here, the significant independent components indicate components having significant values of the components $C_1, C_2, \ldots, C_i, \ldots,$ and $C_l$ of the second matrix C, and the significant values indicate values that do not approximate to "0". For example, when the components $C_i, \ldots,$ and $C_l$ have insignificant values, only i−1 components $C_1, C_2, \ldots,$ and $C_{i-1},$ of l components $C_1, C_2, \ldots, C_i, \ldots,$ and $C_l$ of the second matrix C are significant independent components. Thus, the number of significant independent components searched by the component analyzer 20 is i−1.

For example, it is supposed that the living body is a human body, and the predetermined part is the skin of the human body. Here, the skin mainly includes hemoglobin and melanin components. However, the skin of an icteric person may include a bilirubin component as well as the hemoglobin and melanin components. Thus, when the image obtainer 10 obtains not the skin of the icteric person but the skin of a normal human body, the number of significant independent components analyzed by the component analyzer 20 is "2", and the components $C_i$ (i=3), ..., and $C_l$ of the components $C_1, C_2, \ldots, C_i, \ldots,$ and $C_l$ of the second matrix C may have insignificant values. However, when the image obtainer 10 obtains not the skin of the normal human body but the skin of the icteric, the number of significant independent components analyzed by the component analyzer 20 is not "2" but "3." Thus, the component analyzer 20 may search the number, "3", of significant independent components and determine using the number, "3", of significant independent components whether the obtained image includes a predetermined component, for example, the bilirubin component.

According to another alternative embodiment of the present invention, the apparatus shown in FIG. 1 may further include the second data transformer 18, and the method shown in FIG. 2 may further include operation 48. In this case, after operation 46, the second data transformer 18 may apply an independent component analysis method to the second matrix C to transform the second matrix C into a product of third and fourth matrixes as in Equation 7. Here, the independent component analysis method is disclosed in a book, entitled "Pattern Classification" by Richard O. Duda, Peter E. Mart, and David G. Stork and published by the Wiley Interscience, p. 570.

$$C = E \cdot F \tag{7}$$

wherein E and F denote the third and fourth matrixes, respectively, where component of the fourth matrix F are statistically independent.

Here, the component analyzer 20 infers a pure spectrum M proportional to a product of the first and third matrixes A and E and determines the types of components of the obtained image using the pure spectrum M. In general, the components of the predetermined part of the living body have different spectrums. Therefore, the types of the components of the obtained image may be determined from the pure spectrum M using a database showing relations between spectrums and components.

Moreover, the component analyzer 20 may infer a concentration proportional to the fourth matrix F and determine the inferred concentration F as a concentration of the determined components.

As described above, the Beer's Law must be satisfied so that the pure spectrum M is proportional to the product of the first and third matrixes A and E, and the concentration is proportional to the fourth matrix F. Here, according to the Beer's Law, a spectrum of a sum of two components is equal to a sum of spectrums of the two components.

In the apparatuses for and methods of analyzing components using microscopic regions according to the above-described embodiments of the present invention, a determination can be made as to whether a predetermined part of a living body includes a predetermined component of the living body, for example, a bilirubin component, using a result of obtaining an image of the predetermined part of the living body, for example, an image of the skin of the living body. Also, the type and/or concentration of the component of the predetermined part can be non-invasively analyzed. As a result, the apparatus and the method is not complicated for a living body to be analyzed as well as a user.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus for analyzing components using microscopic regions, comprising:
   an image obtainer obtaining an image of a part of a living body;
   a color information generator generating color information of an image having a matrix pattern from a size of microscopic regions and the obtained image;

a first data transformer transforming the color information of the image into a product of first and second matrixes; and a component analyzer analyzing components of the obtained image using at least one of the first and second matrixes, wherein, when the obtained image is divided into a plurality of microscopic regions, the size of the microscopic regions is determined so that concentrations of components of the part vary in each of the microscopic regions.

2. The apparatus of claim 1, wherein the image obtainer includes an image photographing unit photographing the part.

3. The apparatus of claim 1, further comprising:
a microscopic region size determiner determining the size of the microscopic regions using a specified diffusion coefficient, the specified diffusion coefficient showing a diffusion degree of the components in the microscopic regions, and a specified concentration fluctuation value.

4. The apparatus of claim 3, wherein the microscopic region size determiner determines the size of the microscopic regions according to the following equation:

$$d_1 = \frac{ln\left(\frac{F_t}{K}\right) + \frac{1}{2}\sigma^2(T-t)}{\sigma\sqrt{T-t}},$$

$$d_2 = d_1 - \sigma\sqrt{T-t}$$

wherein $d_1$ and $d_2$ denote horizontal and vertical lengths of each of the microscopic regions, respectively, $\sigma$ denotes the predetermined diffusion coefficient, f denotes the predetermined concentration fluctuation value, t denotes time, T denotes an average resident time, $F_t$ denotes a fluctuating force for the time t, K denotes a viscosity modulus, and f(t) is $f(t)=e^{-r(T-t)}[F_t-N(d_1)-K-N(d_2)]$, where r denotes a lag coefficient, and $N(d_1)$ and $N(d_2)$ denote fugacity functions.

5. The apparatus of claim 1, wherein the first data transformer transforms the color information of the image into the product of the first and second matrixes using a Karhunen-Lowe transformation method, and
wherein components of the second matrix are not correlative and not statistically independent.

6. The apparatus of claim 5, wherein the component analyzer searches a number of significant independent components of the components of the second matrix and determines, using the number of significant independent components, whether the obtained image includes a specified component.

7. The apparatus of claim 5, further comprising a second data transformer applying an independent component analysis method to the second matrix to transform the second matrix into a product of third and fourth matrixes,
wherein components of the fourth matrix are statistically independent, and the component analyzer infers a pure spectrum proportional to a product of the first and third matrixes and determines types of the components of the obtained image using the pure spectrum.

8. The apparatus of claim 7, wherein the component analyzer infers a concentration proportional to the fourth matrix and determines the inferred concentration as a concentration of the determined components.

9. The apparatus of claim 1, wherein the part corresponds to a skin of the living body.

10. A method of analyzing components using microscopic regions, comprising:

obtaining a digital image of a part of a digital living body by photographing the part using an image photographing unit;

generating color information of an digital image having a matrix pattern from a size of microscopic regions and the obtained image;

transforming the color information of the digital image into a product of first and second matrixes; and analyzing components of the obtained digital image using at least one of the first and second matrixes, wherein when the obtained digital image is divided into a plurality of microscopic regions, the size of the microscopic regions is determined so that concentrations of components of the part vary in each of the microscopic regions.

11. The method of claim 10, further comprising:
determining the size of the microscopic region using a specified diffusion coefficient, the specified diffusion coefficient showing a diffusion degree of the components in the microscopic regions, and a specified concentration fluctuation value.

12. The method of claim 10, wherein the color information of the digital image is transformed into the product of the first and second matrixes using a Karhunen-Lowe transformation method, and
wherein components of the second matrix are not correlative and not statistically independent.

13. The method of claim 12, wherein a number of significant independent components of the components of the second matrix is searched and a determination is made, using the number of significant independent components, as to whether the obtained digital image includes a specified component.

14. The method of claim 12, further comprising applying an independent component analysis method to the second matrix to transform the second matrix into a product of third and fourth matrixes,
wherein a pure spectrum proportional to a product of the first and third matrixes is inferred, types of the components of the obtained digital image are determined using the pure spectrum, and components of the fourth matrix are statistically independent.

15. The method of claim 14, wherein a concentration proportional to the fourth matrix is inferred and the inferred concentration is determined as a concentration of the determined components.

16. An apparatus for analyzing components using microscopic regions, comprising:
an image obtainer obtaining an image of a part;
a color information generator generating color information of an image having a matrix pattern using the obtained image and a size of microscopic regions into which the obtained image is divided, the size being such that concentrations of components of the part vary in each of the microscopic regions;
a first data transformer transforming the color information into a product of first and second matrixes; and
a component analyzer analyzing components of the obtained image using at least one of the first and second matrixes.

17. The apparatus of claim 16, further comprising a microscopic region size determiner determining the size of the microscopic regions.

18. The apparatus of claim 16, wherein the image is obtained when the size is determined.

19. The apparatus of claim 16, wherein the image is obtained after the size is determined.

20. A method of determining whether a part includes a component, comprising:

obtaining a digital image of the part by photographing the part using an image photographing unit;

generating color information of a digital image having a matrix pattern from a size of microscopic regions and the obtained digital image;

transforming the color information into a product of first and second matrixes; and analyzing components of the obtained digital image using at least one of the first and second matrixes, wherein the obtained digital image is dividable and when the obtained digital image is divided into a plurality of microscopic regions, the size of the microscopic regions is such that concentrations of components of the part vary in each of the microscopic regions.

* * * * *

UNITED STATES PATENT AND TRADEMARK OFFICE
CERTIFICATE OF CORRECTION

PATENT NO.       : 7,639,850 B2                                            Page 1 of 1
APPLICATION NO.  : 11/145177
DATED            : December 29, 2009
INVENTOR(S)      : Sang-joon Han It is certified that error appears in the above-identified patent and that said Letters Patent is hereby corrected as shown below:

Column 10, Line 1, before "living" delete "digital".

Column 10, Line 4, change "an" to --a--.

Column 10, Line 6, after "obtained" insert --digital--.

Signed and Sealed this

Sixteenth Day of March, 2010

David J. Kappos
*Director of the United States Patent and Trademark Office*